(12) United States Patent
De Marco et al.

(10) Patent No.: US 6,333,379 B1
(45) Date of Patent: Dec. 25, 2001

(54) SUSPENSION POLYMERIZATION PROCESS OF ACRYLIC MONOMERS

(75) Inventors: Cristiano De Marco, Varese; Fabio Giberti; Lorenzo Poggi, both of Milan, all of (IT)

(73) Assignee: ELF Atochem S.A., Puteaux (FR)

( * ) Notice: Subject to any disclaimer, the term of this patent is extended or adjusted under 35 U.S.C. 154(b) by 0 days.

(21) Appl. No.: 09/357,771

(22) Filed: Jul. 21, 1999

(51) Int. Cl.$^7$ ........................................ C08F 2/16
(52) U.S. Cl. ............... 524/804; 524/145; 524/155; 524/366; 524/376; 524/377; 524/801; 524/803
(58) Field of Search .................... 524/145, 155, 524/366, 376, 377, 801, 803, 804

(56) References Cited

U.S. PATENT DOCUMENTS 4,604,416   8/1986   Nakai et al. ................. 524/145

FOREIGN PATENT DOCUMENTS 0 683 182 A2   11/1995   (EP) .
894123   4/1962   (GB) .
WO 84/00762   3/1984   (WO) .

*Primary Examiner*—Samuel A. Acquah
(74) *Attorney, Agent, or Firm*—Arent Fox Kintner Plotkin Kahn

(57) ABSTRACT

Process for preparing antistatic acrylic polymers wherein the acrylic monomers are polymerized in suspension, said acrylic monomers contain dissolved the antistatic additives selected from the following ones:

$$C_nH_{2n+1}CO-N(CH_2CH_2OH)_2 \qquad (1)$$

wherein n is an integer ranging from 9 to 13;

$$C_{n'}H_{2n'+1}N(CH_2CH_2OH)_2 \qquad (2)$$

wherein n' is an integer ranging from 8 to 14;

$$CH_2(OR_1)CH(OR_2)CH_2(OR_3) \text{ or}$$
$$C(CH_2OR_1)(CH_2OR_2)(CH_2OR_3)(CH_2OR_4) \qquad (3)$$

wherein $R_1$, $R_2$, $R_3$, $R_4$ equal to or different from each other, are H or R, wherein R is a saturated or unsaturated $C_{12}$–$C_{18}$ alkylcarboxylate, preferably saturated or monounsaturated $C_{18}$.

12 Claims, No Drawings

SUSPENSION POLYMERIZATION PROCESS OF ACRYLIC MONOMERS

The present invention relates to a process for preparing antistatic acrylic polymers.

More specifically it relates to the production of acrylic (co)polymers beads having antistatic properties combined with optical properties comparable with those of the commercial acrylic copolymers, and with good mechanical and thermal properties.

It is known in the art that acrylic polymers do not show antistatic properties wherefore they easily attract dust and generally all the contaminants contained in the air. This represents a disadvantage for all the acrylic polymer applications where a particular cleanness and optical quality are required. As an example of these applications the vendor machine displays (distributing machines), dashboards, phones, etc., can be mentioned. Industrially, in order to avoid the presence of contaminants during the assembly, antistatic sprays or antistatic liquids which are mechanically distributed on the surface, are used. These systems have the inconvenience to increase the production costs, and the working times with pollution problems. Moreover the efficacy of these systems drastically decreases running the time, of the order of a few days, since they are easily removed from the surface due to any mechanical action. A further disadvantage of these systems is that the uniform distribution on the surface, also using sophisticated and expensive technologies, is not guaranteed. It is to be noted that these treatments are to be repeated during the time in order to maintain the acrylic polymer antistatic properties.

Processes to make antistatic acrylic polymers by preparing a compound in hot extruders or mixers (for instance Brabender) by addition of antistatic additives to the preformed polymer, are also known in the art. These systems have the drawback not to lead to compounds with a good additive distribution in the polymer. In order to obtain a good additive homogenization in the compound it is necessary to submit the additive to high temperatures for prolonged times. This operating way has the disadvantage to degrade the additive, to deactivate or volatilize it with consequent loss of antistatic properties. Tests carried out by the Applicant on pilot scale with extruders having about a 50 kg/h flow-rate have shown that with the known antistatic additives the acrylic polymer optical properties are worsened.

The need was felt to have available an industrial process for the production of antistatic acrylic polymers having anti-static properties combined with optical properties comparable with those of the commercial acrylic copolymers and with good mechanical and thermal properties wherein the antistatic additive is homogeneously distributed in the polymer.

It has been surprisingly and unexpectedly found by the Applicant a process to make the acrylic polymers antistatic which overcomes the disadvantage of the prior art and allows to obtain acrylic polymers with the combination of the above mentioned properties.

An object of the present invention is a process for preparing antistatic acrylic polymers wherein the acrylic monomers are polymerized in suspension, said acrylic monomers contain dissolved the antistatic additives selected from the following:

$$C_nH_{2n+1}CO-N(CH_2CH_2OH)_2 \quad (1)$$

wherein n is an intger ranging from 9 to 13, preferably n=11;

$$C_{n'}H_{2n'+1}N(CH_2CH_2OH)_2 \quad (2)$$

wherein n' is an integer ranging from 8 to 14, preferably n'=12;

$$CH_2(OR_1)CH(OR_2)CH_2(OR_3) \text{ or}$$
$$C(CH_2OR_1)(CH_2OR_2)(CH_2OR_3)(CH_2OR_4) \quad (3)$$

wherein $R_1$, $R_2$, $R_3$, $R_4$ equal to or different from each other, are H or R, wherein R is a saturated or unsaturated $C_{12}$–$C_{18}$ alkylcarboxylate, preferably saturated or monounsaturated $C_{18}$, in class (3) monoesters are the preferred compounds; or their mixtures; the amount of total antistatic additive being in the range 0.2–15 phr (for 100 parts of monomers), preferably in the range 1–5 phr.

The product obtained in the form of beads, generally with size in the range 50–1,000 micron, is subsequently transformed into granules by extrusion with the same conventional techniques of the acrylic polymers. It has been surprisingly found that the antistatic additive does not undergo a degradation, modification or meaningful loss.

The so obtained granules can be used for the injection molding to obtain manufactured articles having antistatic properties which substantially remain unchanged during the time, combined with optical, mechanical and thermal properties, comparable with those of the starting acrylic polymers.

The suspension polymerization is well known and is a type of polymerization carried out in a system wherein the monomer is suspended under the form of little drops in a continuous phase and polymerized by using a radicalic type initiator soluble in the monomer. The continuous phase is generally water.

The ratio between the continuous phase (water) and the discontinuous phase (monomer) is generally in the range 1:1–3:1.

In the practical carrying out of this kind of process, it is necessary the use of suspension stabilizers which hinder the monomer little drops coalescence in the most advanced polymerization stages.

As suspension stabilizers, in the most common technique, hydrosoluble macromolecular compounds having an affinity towards the monomer are used. The stabilizer places itself at the interface between organic phase and aqueous phase, and forms a protective film which hinders the polymeric particle agglomeration.

At the end of the polymerization the suspending agent is removed from the polymer particle surface by washing with water.

See for example EP 457,356, herein incorporated by reference, wherein, as suspending and stabilizing agents of the aqueous suspension, polymers selected from the homopolymers of compounds having the formula $$CH_2=CR_a-CO-A-CR_bR_c-CH_2-SO_3M \quad (I)$$

are used, wherein: $R_a$=H, $CH_3$; $R_b$ and $R_c$, equal to or different, are H, $C_1$–$C_8$ alkyls and M=alkaline, alkaline-earth metal or ammonium, A=NH, O or $NCH_3$, or the copolymers of said compounds with acrylic monomers in amounts in the range 0–40% by weight.

As continuous phase instead of water the polymerization aqueous phase, totally or partially formed by the mother liquors obtained after the acrylic polymer separation, can be used, said mother liquors containing an organic phase comprising said suspending agent and other products obtained in polymerization, optionally added with an additional amount of said suspending agent so as to have a suspending medium containing at least 0.05% by weight and up to about 1% by weight of said suspending agent and at least 0.05% by weight, the maximum extent being up to about 5% by weight, of the above mentioned other products obtained in polymerization, preferably 0.1–0.5% by weight of the suspending agent and 0.1–1% by weight of the other products obtained in polymerization. This process is described in EP 683,182 in the name of the Applicant herein incorporated by reference.

As suspending agents which can be used in the suspension polymerization besides the suspending agents of formula (I), those known used in this kind of polymerization, such as polyvinylic alcohol, poly(meth)acrylic acid, etc., can be mentioned.

The acrylic polymer is separated from the mother liquors, for instance by centrifugation or filtration. The process can be carried out using the modalities known for the aqueous suspension polymerizations, that is, by operating with ratios between the aqueous phase and the acrylic monomers generally in the range 1:1–3:1, in the presence of suspending agents and of a radical polymerization initiator at temperatures at which the initiator decomposition occurs, generally in the range 50° C.–120° C. The aqueous phase is totally (100%) or partially formed, also in the range 30–50% by weight, by the mother liquors obtained by a previous polymerization provided that the above mentioned limits are observed. It is possible to recycle from 30 to 100% by weight of said mother liquors, if necessary by integrating with further amounts of water optionally containing fresh suspending agent.

The acrylic monomers which can be polymerized according to the process of the present invention are $C_1$–$C_8$ alkylacrylates or methacrylates such as, for example, methyl (meth)acrylate, ethyl(meth)acrylate, propyl(meth)acrylate, isopropyl(meth)acrylate, butylacrylate, sec-butylmethacrylate, terbutylmethacrylate. Said acrylic monomers can be used singly or in admixture each other, optionally in the presence of other monomers, in amounts of at most 50% by weight, containing double bonds, such as, for example, styrene, alpha-methylstyrene, (meth)acrylonitrile, alkyl-, cycloalkyl- or arylmaleimides, butadiene, (meth)acrylic acid, (meth)acrylamide.

As radicalic initiators peroxides such as for example t-butylperoxy-2-ethylhexanoate, dibenzoylperoxide, t-butylperoxydiethylacetate or unstable azocompounds such as, for example, azodiisobutyronitrile, can be used.

Examples for illustrative but not limitative purposes of the present ivention are given hereinafter.

EXAMPLE 1
(Suspendant Preparation)

In a reactor 120 parts of a 40% by weight NaOH solution and 630 parts of deionized water are introduced. 250 parts of 2-acrylamido-2-methylpropansulphonic (AMPS) acid are slowly fed, then the pH is adjusted in the range 7–8 with small additions of soda or AMPS. After the solution has been fluxed with nitrogen to eliminate oxygen and heated to 50° C., 0.075 parts of potassium persulphate and 0.025 parts of sodium methabisulphite are added. The polymerization is completed in about 60 minutes. Then it is diluted with 4,000 parts of deionized water obtaining a solution with a dry residue at 160° C. of 5.5% by weight and a Brookfield viscosity of 4 Pa·s, determined at 25° C.

EXAMPLE 2
(Comparative)

The methylmethacrylate and methylacrylate suspension polymerization is carried out, using as suspending agent the sodic salt homopolymer of the 2-acrylamido-2-methylpropansulphonic acid obtained in Example 1.

In a stirred, jacketed and pressure-resistant reactor, 193 parts of deionized water and 7 parts of the solution obtained in Example 1, corresponding to 0.385 parts of dry product, are introduced. The oxygen is elimianted by nitrogen flow and the solution is heated to 80° C. Then 100.67 parts of a mixture, it too deoxygenated, formed by: methylmethacrylate 98 parts, methylacrylate 2 parts, benzoyl peroxide 0.5 parts, n-butanthiol 0.17 parts, are fed.

The reactor is hermetically sealed, pressurized at 100 KPa and under continuous stirring the mixture is gradually heated up to 110° C. in 120'. The reactor is allowed to stay at 110° C. for 15 minutes, then it is cooled.

The polymer, in the form of beads, is separated from the mother liquors by centrifugation, washed with deionized water and dried in stove at 80° C.

The mother liquors, with a dry residue at 160° C. of about 0.6% by weight, partly formed by the suspending agent (0.2% by weight) and for the remaining fraction by acrylic polymer in the form of particles in emulsion, are collected in order to be used in the subsequent polymerization tests.

EXAMPLE 3
(Comparative)

In the same reactor already used in Example 2 and with the general operating modalities described in said Example, the methylmethacrylate and methylacrylate suspension polymerization is carried out, using as suspending solution the mother liquors coming from the polymerization described in Example 2, without further addition of the suspending agent.

200 parts of mother liquors of Example 2 are then introduced in the reactor. The solution is heated to 80° C. and then 100.67 parts of a mixture, formed by: methylmethacrylate 98 parts, methylacrylate 2 parts, benzoyl peroxide 0.5 parts, n-butanthiol 0.17 parts, are fed.

The polymerization is carried out according to the procedures already described in Example 2. The reactor is allowed to stay at 110° C. for 15 minutes, then it is cooled.

The polymer, in the form of beads, is separated from the mother liquors by centrifugation, washed with deionized water and dried in stove at 80° C.

The mother liquors show a dry residue at 160° C. of about 0.7% by weight, partly formed by the suspending agent (0.2% by weight) and for the remaining fraction by acrylic polymer in the form of particles in emulsion.

EXAMPLE 4

The methylmethacrylate and methylacrylate suspension polymerization is carried out, using as suspending agent the sodic salt homopolymer of the 2-acrylamido-2-methylpropansulphonic acid obtained in Example 1. In a stirred, jacketed and pressure-resistant reactor, 193 parts of deionized water and 7 parts of the solution obtained in Example 1, corresponding to 0.385 parts of dry product, are introduced. The oxygen is eliminated by nitrogen flow and the solution is heated to 80° C. Then 103.67 parts of a mixture, it too deoxygenated, formed by: methylmethacrylate 98 parts, methylacrylate 2 parts, antistatic agent of formula (1) 3 parts, benzoyl peroxide 0.5 parts, n-butanthiol 0.17 parts, are fed.

The reactor is hermetically sealed, pressurized at 100 KPa and under continuous stirring the mixture is gradually heated up to 110° C. in 120'. The reactor is allowed to stay at 110° C. for 15 minutes, then it is cooled.

The polymer, in the form of beads, is separated from the mother liquors by centrifugation, washed with deionized water and dried in stove at 80° C.

The mother liquors show a dry residue at 160° C. of about 0.6% by weight, partly formed by the suspending agent (0.2% by weight) and for the remaining fraction by acrylic polymer in the form of particles in emulsion.

The obtained polymer beads are dissolved in $CHCl_3$ and then reprecipitated in hexane.

The FT-IR analysis of the fraction soluble in hexane of the so obtained beads shows the presence of the additive. This confirms that the additive is wholly englobed in the beads themselves.

EXAMPLE 5

In the same reactor already used in Example 2 and with the general operating procedures described in said Example, the methylmethacrylate and methylacrylate suspension polymerization is carried out, using as suspending solution the mother liquors coming from the polymerization described in Example 2, without further addition of the suspending agent.

200 parts of mother liquors of Example 2 are then introduced in the reactor. The solution is heated to 80° C. and then 103.67 parts of a mixture, formed by: methylmethacrylate 98 parts, methylacrylate 2 parts, antistatic agent of formula (1) 3 parts, benzoyl peroxide 0.5 parts, n-butanthiol 0.17 parts, are fed.

The polymerization is carried out according to the procedures already described in Example 2. The reactor is allowed to stay at 110° C. for 15 minutes, then it is cooled.

The polymer, in the form of beads, is separated from the mother liquors by centrifugation, washed with deionized water and dried in stove at 80° C.

The mother liquors show a dry residue at 160° C. of about 0.7% by weight, partly formed by the suspending agent (0.2% by weight) and for the remaining fraction by acrylic polymer in the form of particles in emulsion.

The obtained polymer beads are dissolved in $CHCl_3$ and then reprecipitated in hexane.

The FT-IR analysis of the fraction soluble in hexane of the so obtained beads shows the presence of the additive. This confirms that the additive is wholly englobed in the beads themselves.

EXAMPLE 6

In the same reactor already used in Example 2 and with the general operating procedures described in said Example, the methylmethacrylate and methylacrylate suspension polymerization is carried out, using as suspending solution the mother liquors coming from the polymerization described in Example 2, without further addition of the suspending agent.

200 parts of mother liquors of Example 2 are then introduced in the reactor. The solution is heated to 80° C. and then 105.67 parts of a mixture, formed by: methylmethacrylate 98 parts, methylacrylate 2 parts, antistatic agent of formula (3) 5 parts, benzoyl peroxide 0.5 parts, n-butanthiol 0.17 parts, are fed.

The polymerization is carried out according to the procedures already described in Example 2. The reactor is allowed to stay at 110° C. for 15 minutes, then it is cooled.

The polymer, in the form of beads, is separated from the mother liquors by centrifugation, washed with deionized water and dried in stove at 80° C.

The mother liquors show a dry residue at 160° C. of about 0.7% by weight, partly formed by the suspending agent (0.2% by weight) and for the remaining fraction by acrylic polymer in the form of particles in emulsion.

The obtained polymer beads are dissolved in $CHCl_3$ and then reprecipitated in hexane.

The FT-IR analysis of the fraction soluble in hexane of the so obtained beads shows the additive presence. This confirms that the additive is wholly englobed in the beads themselves.

EXAMPLE 7

In a stirred, jacketed and pressure-resistant reactor, 297 parts of deionized water and 3 parts of polyvinylic alcohol having a viscosity in the range 5–20 cPs at a 5% by weight concentration, are introduced. The oxygen is eliminated by nitrogen flow and the solution is heated to 80° C. Then 103.67 parts of a mixture, it too deoxygenated, formed by: methylmethacrylate 98 parts, methylacrylate 2 parts, antistatic agent of formula (2) 3 parts, benzoyl peroxide 0.5 parts, n-butanthiol 0.17 parts, are fed.

The polymerization is carried out according to the procedures already described in Example 2. The reactor is allowed to stay at 110° C. for 15 minutes, then it is cooled.

The polymer, in the form of beads, is separated from the mother liquors by centrifugation, washed with deionized water and dried in stove at 80° C.

The mother liquors show a dry residue at 160° C of about 0.6% by weight, partly formed by the suspending agent (0.2% by weight) and for the remaining fraction by acrylic polymer in the form of particles in emulsion.

The obtained polymer beads are dissolved in $CHCl_3$ and then reprecipitated in hexane.

The FT-IR analysis of the fraction soluble in hexane of the so obtained beads shows the additive presence. This confirms that the additive is wholly englobed in the beads themselves.

EXAMPLE 8

The beads obtained according to the methods described in Examples 2–5 were granulated by monoscrew extruder according to the usual methods for PMMA. The beads are loaded in a feedbox from which they are introduced in the extruder. A Bandera TR30 monoscrew extruder is used, having the following characteristis:

| | |
|---|---|
| Length/diameter (L/D) = | 25 |
| Flow-rate (Kg/h) = | 5 |
| Extruder temperature (° C.) | |
| $1^{st}$ zone (15 cm from feeding) = | 210 |
| $2^{nd}$ zone (29 cm from feeding) = | 230 |
| $3^{rd}$ zone (59 cm from feeding) = | 230 |
| $4^{th}$ zone (75 cm from feeding) = | 220 |

The Melt Flow Rate (M.f.r.) of the so obtained granules was measured, see Table 1.

The so obtained granules were injection molded so as to obtain specimen suitable to the determination of the thermal, optical and antistatic properties according to the methods indicated in Table 1.

For the thermal properties (Vicat) and antistatic (surface resistivity) the specimen are disks having 66 mm diameter and 3.2 mm thickness for the Vicat and 66 mm diameter and 1.6 mm thickness for the antistatic properties.

As to the optical properties (Transmittance Ts, Haze, Yellow Index Y.I.) the specimen are rectangular plates having 90×60 mm sizes and a 4 mm thickness. The results are shown in Table 1.

EXAMPLE 9

(Comparative)

Example 8 was repeated using the polymer beads of Example 3 to which 3 phr of additive of formula (1) of Example 5 were added by extrusion.

The results are shown in Table 1.

The comparison of the results of Example 5, beads obtained with the antistatic agent directly in the polymerization process, and of Example 9, beads charged with the antistatic agent in extruder, reported in Table 1 shows that the antistatic properties are clearly better in Example 5 (lower resistivity value) compared with those of Example 9. Moreover it is noted that the very good resistivity values of Example 5 are combined with clearly superior optical properties, Haze and Y.I.

TABLE 1

| | M.f.r. ISO R-1133 | Vicat ISO R-306 | Surface resistivity ASTM D-527 ($\Omega$) | | Ts ASTM D-1003 | Haze ASTM D-1003 | Y.I. |
|---|---|---|---|---|---|---|---|
| | (g/10') | (° C.) | 3 days | 30 days | (%) | (%) | ASTM D-1925 |
| Ex. 2 | 3.0 | 108 | >$10^{16}$ | >$10^{16}$ | 92.7 | 0.2 | 0.2 |
| Ex. 3 | 3.0 | 108 | >$10^{16}$ | >$10^{16}$ | 92.7 | 0.2 | 0.2 |
| Ex. 4 | 4.4 | 103 | $9 \times 10^{12}$ | $3 \times 10^{13}$ | 92 | 0.5 | 0.6 |
| Ex. 5 | 4.5 | 103 | $8 \times 10^{12}$ | $2 \times 10^{13}$ | 92 | 0.5 | 0.6 |
| Ex. 9 | 4.5 | 103 | $9 \times 10^{13}$ | $1 \times 10^{15}$ | 91 | 1 | 2 |

What is claimed is:

1. A process for preparing an antistatic acrylic polymer comprising polymerization of an acrylic monomer in a suspension, said acrylic monomer comprising a dissolved antistatic additive selected from the group consisting of:

$$C_nH_{2n+1}CO-N(CH_2CH_2OH)_2 \qquad (1)$$

wherein n is an integer ranging from 9 to 13;

$$C_{n'}H_{2n'+1}N(CH_2CH_2OH)_2 \qquad (2)$$

wherein n' is an integer ranging from 8 to 14; and $$CH_2(OR_1)CH(OR_2)CH_2(OR_3) \text{ or}$$
$$C(CH_2OR_1)(CH_2OR_2)(CH_2OR_3)(CH_2OR_4), \qquad (3)$$

wherein $R_1$, $R_2$, $R_3$, and $R_4$ are the same or different from each other, and $R_1$, $R_2$, $R_3$, and $R_4$ are an H or R group, wherein R is a saturated or unsaturated $C_{12}-C_{18}$ alkylcarboxylate, a class (3) monoester, or a combination thereof, and wherein the antistatic additive is present at a final concentration in a range 0.2–15 phr for 100 parts of monomer.

2. The process according to claim 1, the process comprising extruding said antistatic acrylic to form a granule with a granulometry in a range of 50–1,000 microns.

3. The process according to claim 1, wherein the process is carried out in aqueous suspension.

4. The process according to claim 3, wherein the aqueous suspension is totally or partially formed by mother liquors obtained from a previous polymerization.

5. The process according to claim 4, wherein said mother liquors comprise at least 0.05% by weight of a suspending agent.

6. The process according to claim 1, comprising adding a suspending agent in the form of hydrosoluble macromolecular compound having an affinity for the monomer, and which hinders agglomeration of the polymer.

7. The process according to claim 5 or 6, wherein said suspending agent of the aqueous suspension is a homopolymer of a compound of formula $$CH_2=Cr_a-CO-A-CR_bR_c-CH_2-SO_3M \qquad (I),$$

wherein $R_a$ is H or $CH_3$;

$R_b$ and $R_c$ are the same or different, and each represents a hydrogen or a $C_1-C_8$ alkyl;

M is alkaline, alkaline-earth metal or ammonium; and

A is NH, O or $NCH_3$, or a copolymer of said compound of formula (I) and said acrylic monomer in a range of 0–40% by weight.

8. The process according to claim 6, wherein said suspending agent is polyvinylic alcohol or poly(meth)acrylic acid.

9. The process according to claim 1, wherein said acrylic monomer is at least one of a $C_1-C_8$ alkylacrylate or a methacrylate selected from the group consisting of methyl (meth)acrylate, ethyl(metho)acrylate, propyl(meth)acrylate, isopropyl(meth)acrylate, butylacrylate, sec-butylmethacrylate, and terbutylmethacrylate.

10. The process according to claim 9, comprising at least one of said acrylic monomer, which is the same or different, at a concentration of not more than 50% by weight.

11. The process according to claim 9, wherein said acrylic monomer is double bonded and is selected from the group consisting of styrene, alpha-methylstyrene, (meth)acrylonitrile, alkylcycloalkyl-maleimide or aryl-maleimide, butadiene, (meth)acrylic acid, and (meth)acrylamide.

12. The process according to claim 1, wherein an acrylic monomer of claim 9 is mixed with an acrylic monomer of claim 11 at a concentration of not more than 50% by weight.

* * * * *